July 18, 1961 T. C. BURNETTE, JR 2,993,168
POWER-ACTUATED TESTING MECHANISMS
Filed March 12, 1958 2 Sheets-Sheet 1
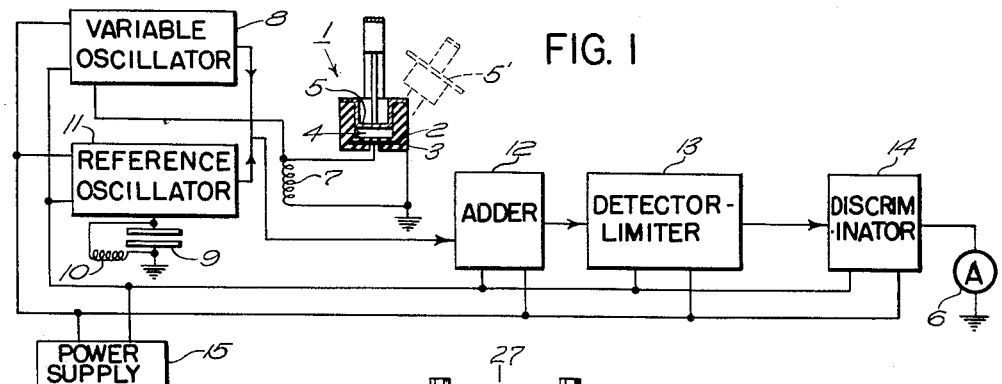
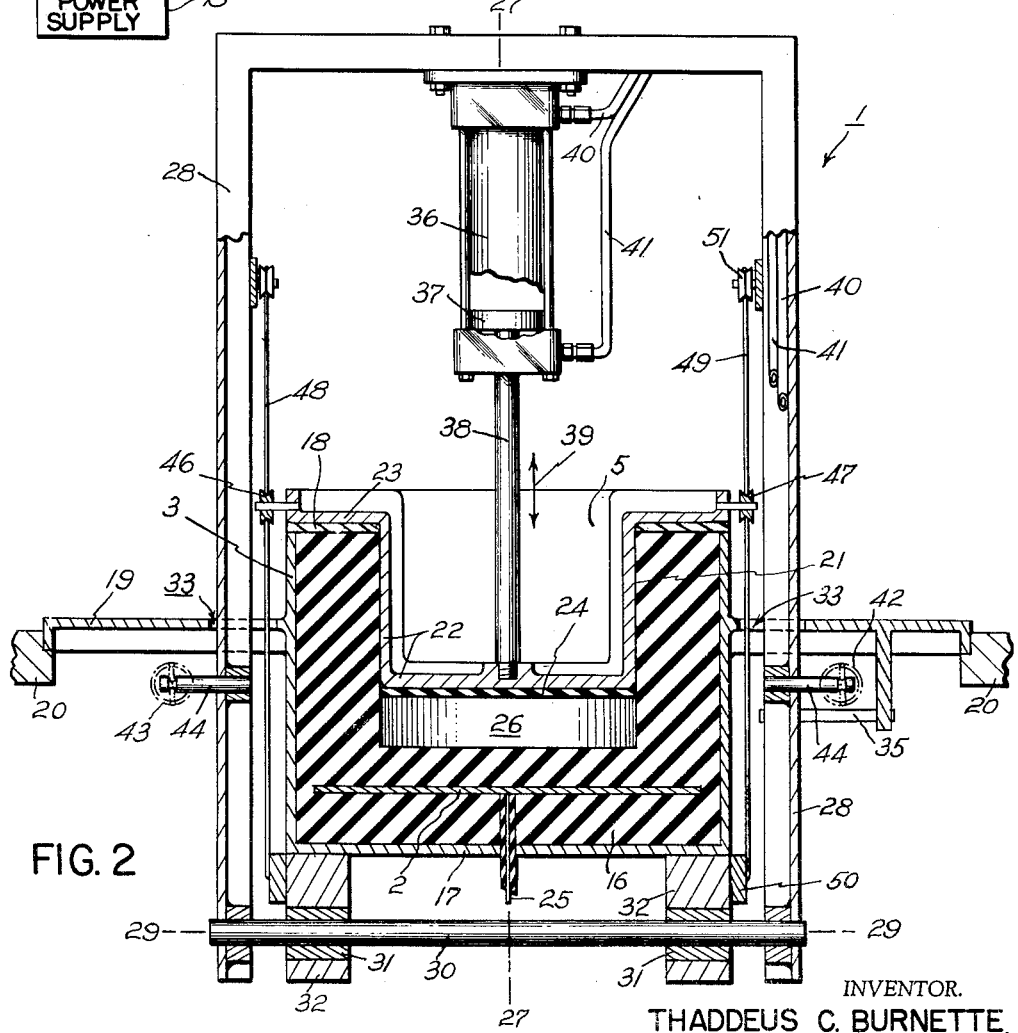
INVENTOR.
THADDEUS C. BURNETTE, Jr.
BY
Dike, Thompson & Bronstein
ATTORNEYS July 18, 1961  T. C. BURNETTE, JR  2,993,168
POWER-ACTUATED TESTING MECHANISMS
Filed March 12, 1958  2 Sheets-Sheet 2
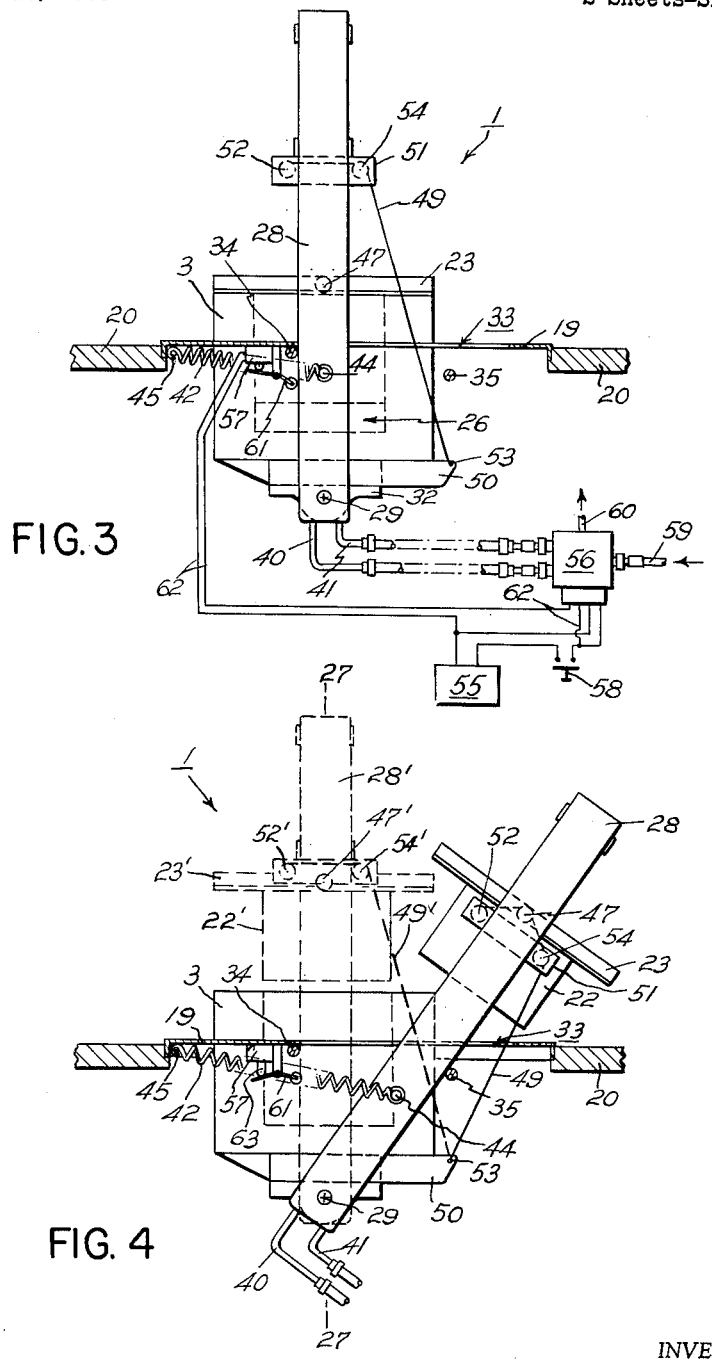
INVENTOR.
THADDEUS C. BURNETTE, Jr.
BY
Dike, Thompson & Bronstein
ATTORNEYS

United States Patent Office 2,993,168
Patented July 18, 1961

2,993,168
POWER-ACTUATED TESTING MECHANISMS
Thaddeus C. Burnette, Jr., Norwood, Mass., assignor to Forte-Fairbairn Inc., Norwood, Mass., a corporation of Delaware
Filed Mar. 12, 1958, Ser. No. 720,942
7 Claims. (Cl. 324—61)

The present invention relates to apparatus for the precision testing of materials, and, in one particular aspect, to improved capacitor test cells wherein accurate measurements of properties of bulk materials are facilitated and accelerated through power-operated mechanisms.

The accurate measurement of properties of materials is often a highly important prerequisite to successful control or processing in a number of industries, and, by way of example, it is noted that the moisture content of materials is particularly significant information in those industries involving textiles, chemicals, foodstuffs, and the like. It is known that composition, workability, and storage factors may be largely influenced by moisture content, such that it can involve costly error to proceed with weaving and spinning operations in textile manufacture, or to mix or chemically combine ingredients in other manufacturing operations, without first carefully establishing the moisture content of the stock involved. The relatively elementary practice of baking and weighing may permit measurement of this factor, or, preferably, rapid direct-indicating electronic detection apparatus may be utilized in the measurement of moisture content. Electronic detection techniques are generally better suited to satisfy demands for swift and uncomplicated measurement, and certain aspects of the present teachings are pertinent to improved detection apparatus of this type. Highly satisfactory measurements have been attained with certain forms of equipment responsive to variations in capacitivity of tested materials, the measurements being responsive to variations in capacitance of a capacitor detector unit wherein the evaluated material functions as dielectric. Capacitivity of a material is a function of the dielectric constant it exhibits by virtue of properties such as moisture content, dimensions, and other composition, and knowledge of certain of these properties can in turn lead to conclusions about others. Where the measurement sought to be made is that of moisture content alone, and where the measurement must be precise, the several additional known factors which may affect capacitance must be eliminated or compensation provided therefor. Such complicating factors may include size, weight, density, test position, and moisture distribution characteristics of the material, and it has been found possible to virtually eliminate errors from these sources through utilization of capacitor test cell constructions generating substantially uniform electric flux fields through a test region of predetermined dimensions into which the evaluated material is lightly compacted. As a practical matter, these cells must be highly ruggedized and of proportions ample enough to accommodate bulk material in volumes of commercial importance, yet they should also permit ready insertion and removal of material, occupy minimum plant space, be operable easily and with safety by unskilled personnel, and preserve extremely high measurement accuracy and stability.

Accordingly, it is one of the objects of the present invention to provide improved electrical measurement apparatus wherein electrical testing members are power actuated into precise relationships through simple and low-cost drive and control mechanisms.

Another object is to provide improved capacitor test cells which facilitate rapid and sensitive measurements of moisture content of bulk material.

It is yet another object to provide capacitor test cell apparatus having simple pneumatic mechanisms for accurately and automatically actuating an electrode assembly through multiple movements of different character.

By way of a summary account of practice of this invention in one of its aspects, there is provided in an electronic moisture detection system a capacitive test cell in the general form of a hollow conductive container and electrode of relatively large dimensions accommodating within it a commercial size bulk of material, such as bulk wool, cashmere, or other fibers. The hollow outer capacitor electrode, which is maintained at a ground potential in the system, provides an electrically continuous outer shielding surface interrupted only by a cable connection for a second capacitor electrode disposed within it in an insulated relationship. A portion of this same outer electrode structure is constructed as a removable piston-type conductive element which nests within other portions of the outer electrode structure to define with the inner elecrode a measurement cavity of predetermined dimensions. This cavity accommodates the bulk material which is to be evaluated, and, for purposes of admitting and removing the material from the cavity, the removable piston-like portion of the outer electrode structure is coupled for actuation by the piston of a pneumatic chamber fixed to a movable yoke. Movements of the yoke are permitted only about a given pivot axis, and the yoke is normally spring biased to a stop position in which the piston-like electrodes may be raised from and lowered directly into the accommodating opening in the outer electrode structure. Through a suitable pneumatic valve, the removable electrode member may be moved only linearly upon controlled pressurizing and exhausting of portions of the pneumatic cylinder. However, a tensioned wire assembly which is disturbed upon pneumatic withdrawal of the removable member of the outer electrode structure simultaneously deflects the yoke about its pivot axis such that both the yoke assembly and removable electrode member are removed from the vicinity of the opening in the outer electrode structure. At such times, the test cell cavity may be emptied of and refilled with material to be tested without physical interference. The pneumatic control valve assembly is electrically actuated to initiate the aforesaid operation and, thereafter, to return the removable electrode member to the measurement position in which it is fully nested within portions of the outer electrode structure.

Although the features of this invention which are believed novel are set forth in the appended claims, greater detail of the invention in its preferred embodiments and the further objects and advantages thereof may be readily comprehended through reference to the following description taken in connection with the accompanying drawings, wherein:

FIGURE 1 depicts in a partly schematic and partly block-diagrammed form one moisture detection system wherein the teachings of the present invention may be practiced advantageously;

FIGURE 2 provides a cross-sectioned front view of one preferred form of capacitor test cell assembly including automatic positioning and control provisions in accordance with the teachings of this invention;

FIGURE 3 is a side view of the FIGURE 2 test cell apparatus together with pneumatic and electrical control elements; and FIGURE 4 illustrates in a side view the same apparatus under certain conditions of automatic actuation.

One advantageous arrangement for the measurement of moisture content of bulk material with test cells produced in accordance with the present teachings is represented in a partly schematic and partly block-diagrammed form in FIGURE 1 of the drawings. A capacitive test cell 1, having an inner electrode 2 within a surrounding grounded electrode 3, is adapted to receive a quantity of bulk material within a cavity 4 when the cover, in the form of a plunger 5, is withdrawn from the cell in the manner portrayed by the dashed-line representation 5'. Effects of the tested material upon the exhibited capacitance of the cell are characterized in the output indications of an indicating instrument 6. Capacitor test cell 1 is illustrated in a paralleled relationship with inductance 7 to provide a frequency control circuit for a variable oscillator 8, and counterparts of these elements are found in the reference capacitor 9, inductance 10, and a reference oscillator 11. The output frequency of variable oscillator 8 bears a relationship to the dielectric constant exhibited between electrodes of cell 1, and the frequency of output signals from reference oscillator 11 is established by reference capacitor 9 which is essentially fixed though adjustable over a small range to compensate for long term drift effects if they should occur. Addition of the two oscillator outputs, as by an adder circuit 12, yields one component of further output signals substantially equal to the differences between oscillator frequencies, and preferably in an audio frequency range. Detector-limiter unit 13 accomplishes a demodulation which results in a signal of frequencies substantially equal to the difference in oscillator frequencies, and amplitude errors are eliminated in a limiting operation. The output of detector-limiter 13 is thus found to be in the form of pulses of uniform amplitude and periodicities corresponding to differences in output signals generated by variable oscillator 8 and reference oscillator 11. Discriminator 14, which is preferably of a non-resonant type, is excited by the pulse signal output of detector-limiter 13 to deliver current through instrument 6, in the form of an ammeter, which also becomes accurately related to the aforesaid frequency differences. Power excitation of the various components is preferably derived from a regulated power supply 15 to promote stability. If desired, details of circuitry which may be employed in a measuring system such as that which has been described may be observed through reference to the copending application of Stanley Breen for "Apparatus and Method for Measuring Capacitivity of a Material," Serial No. 691,269, filed October 21, 1957, and assigned to the same assignee as that of the present application. It will be recognized that a system of the foregoing character will yield output indications related to dielectric properties of materials under evaluation in test cell 1. Inasmuch as the test cell portrayed in the measurement system of FIGURE 1 is intended to be of the same general construction as that detailed in FIGURE 2, the same reference characters are employed in both figures. In the latter figure, which comprises a cross-sectioned front view of a preferred test cell construction, the inner capacitor electrode 2 is shown to be embedded in a casting resin 16 within the outer electrode structure 3 which is conductive and is in the form of a hollow cylinder completely closed at one end 17 and partially closed at the opposite end by an annular plate portion 18. Outer electrode 3 also conveniently serves as a main frame or casting unit and, for such purposes, is provided with an integral and substantially planar flange 19 which fixes the position of the cell within an accommodating opening in the top 20 of a console-type enclosure. Insulating casting resin 16 is provided with a central cylindrical bore 21 of the same diameter as the inner diameter of annular plate 18, this bore extending close to the inner circular electrode plate 2. The cylindrical bore thus defined may be partially occupied by a cooperating and closely mating piston-like plunger 5 which has both a depending cylindrical portion 22 closed on the bottom thereof and an integral annular flange portion 23 disposed to abut and rest upon the top surfaces of annular plate 18. To the flat bottom surface of plunger 5 there is also affixed a flat circular plate of insulating material, such as polystyrene, which may aid in preserving desired fixed dielectric properties of the cell. When the plunger and remaining portions of the cell assembly are brought into the illustrated fully nested relationship, the plunger 5 becomes electrically coupled with other portions of the outer electrode structure 3 through conductive plate 18 and the interior of the cell becomes fully enclosed and shielded by the conductive material on the exterior thereof. One small opening in the lower part of the cell admits the insulated cable 25 which is coupled to the inner electrode plate 2. It will also be perceived that in the aforesaid nested relationship of parts a cavity 26 remains unoccupied, and it is into this cavity that bulk material, such as loose fibers, is lightly compacted by plunger 5 to occupy substantially the full predetermined volume of the cavity under measurement conditions. Inner electrode plate 2 is preferably larger than the lower surface of plunger 5, as illustrated, such that the electric flux field traversing the cavity 26 will be essentially uniform and comprised of parallel lines of force, with fringing field lines passing between the inner electrode plate and outer electrode structure in other regions.

In the measurement of moisture content, the evaluated samples of material are made as large as practicable, such that better statistical results will be achieved, and it thus follows that the test cells themselves must be of relatively large proportions and of rugged construction. In practice, this occasions a rather massive plunger 5, which must be seated within and removed from the inner cell bore as each sample is subjected to measurement. Plunger 5 must not only be seated to rest firmly upon annular plate 18 when measurements are performed, but it should be oriented angularly about the longitudinal cell axis 27—27 to substantially the same position each time an evaluation is made. This requirement appears because even minute mechanical displacements between capacitor plates can occasion intolerably large deviations in capacitance thereof, and it may be noted, for example, that it is exceedingly difficult to establish perfectly flat electrode surfaces and a perfect parallelism between plates even if they are machined flat with a high degree of precision. However, errors likely to arise because of this difficulty can be reduced to negligible proportions when, in addition to providing an accurate mating of nesting parts, the movable plate is oriented to a fixed position about the longitudinal cell axis during each test. Accurate machining of the abutting top surface of annular plate 18 and lower surface of plunger flange 23 aids in realizing a predetermined capacitor electrode spacing.

Desired power-actuated and controlled movements of the capacitor plunger 5 which will overcome the difficulties alluded to earlier herein are occasioned by a pneumatic cylinder and piston arrangement in combination with a tensioned cable assembly, spring-restrained yoke structure, and simple form of electrical and pneumatic control system. The U-shaped yoke structure, 28, is shown to be mounted for pivotal movement about an axis 29—29, with the pivot shaft 30 thereof being movable in bearings 31 fixed to the supports 32 held by the outer electrode and frame 3. Pivot axis 29—29 is perpendicular to the longitudinal cell axis 27—27 and is disposed below the electrode structure such that certain amplified movements may result. The legs of the yoke or frame 28 extend upwardly from the pivot axis through accommodating openings or slots 33 in mounting flange 19 and their limits of angular movement are established by fixed stop members 34 and 35, which are best perceived in FIGURES 3 and 4. From the upper cross member of yoke 28 a rigidly attached pneumatic chamber 36 and cooperating movable piston 37 extend a movable piston shaft 38 in the direction of the electrode structure. Shaft 38 has the lower end thereof fastened to the center of the plunger 5, and as pressurized fluid is admitted to and exhausted from cylinder 6 on different sides of the piston 37, the piston shaft and plunger may be reciprocated in the directions indicated by arrows 39. Tubes 40 and 41 provide the necessary fluid couplings for control of the piston and plunger positions. It should be apparent that this pneumatic actuating arrangement will lower plunger 5 to the firmly nested relationship with other parts shown in FIGURE 2 and that it will also function to raise plunger 5 to an upper position in which the plunger is entirely removed from the bore 21 and is provided with enough clearance from the top of the electrode structure 3 to permit pivotal movement of the yoke about axis 29—29 without interference between the plunger and outer electrode structure. As appears in both FIGURES 2 and 3, the yoke is urged by tensioned springs 42 and 43 to a position against stop 34 wherein the piston shaft 38 is aligned with the longitudinal axis 27—27 of the test cell. For this purpose, springs 42 and 43 each have one end fastened to one leg of the yoke and their opposite ends fastened to the flange 19, the pins 44 and 45 serving to provide the required connections. In this spring-biased and stop position, the plunger 5 may be accurately lowered into or withdrawn from the remaining portions of the cell structure.

Unless the yoke or frame 28 is of exceptional height and the piston stroke correspondingly very large, both of which conditions are impractical, the plunger 5 could constitute an interference with loading and unloading of bulk material, even when fully withdrawn. Accordingly, the described cell construction avoids this difficulty through the provision of pivotal freedom of yoke 28 about axis 29—29, whereby, as is depicted in FIGURE 4, both the yoke and plunger may be advantageously displaced from the vicinity of the bore 21. This pivotal motion is caused to occur automatically as plunger 5 is raised by piston shaft 38 beyond the position wherein the plunger clears the top of the outer electrode structure. At just this point in its upward travel, plunger 5 presses diametrically opposite interference members, in the form of rollers 46 and 47, against taut wire cables 48 and 49, respectively, and these cables are caused to exert forces drawing the yoke backward against restraint of the springs 42 and 43. In FIGURES 3 and 4, the taut wire assembly is more clearly depicted, and it will be noted there that wire cable 49 has its lower end attached to a fixed bracket 50 held by the structure 3 and that the upper end of the cable is fastened to a cross piece 51 on one leg of yoke 28. Intermediate the upper and lower fastening positions 52 and 53, respectively, wire cable 49 passes over an idler roller 54, and, as the plunger roller 47 is raised together with the plunger, it engages cable 49 between the upper fastening position 52 and the position of idler roller 54, thereby pulling the wire cable at this section and causing the remaining section to be shortened. The aforesaid shortening can only occur as a result of backward pivotal movement of yoke 28, which backward movement takes place until yoke 28 engages the back stop 35. The dashed-line representation of the yoke assembly and partially raised plunger in FIGURE 4 has elements identified by the same reference characters as employed with the full-line showing, except that distinguishing single prime accents are added for purposes of distinction. It may be perceived that roller 47' fixed with plunger flange 23' is about to engage the cable stretched between position 52' and the intermediate roller 51'. When the cable has been pressed between these positions upon further elevation of plunger 5, the yoke 28 has been deflected about its pivot axis 29—29 to the full-line position depicted in FIGURE 4, and the operator may then have free access to the cavity within the test cell. Wire cable 48 is similarly arranged with co-operating elements corresponding to those interacting with wire cable 49.

The yoke and capacitor plunger remain in the fully deflected position depicted in FIGURE 4 while the lower portion of pneumatic chamber 36 is fully pressurized. Thereafter, as both portions of pneumatic chamber 36 are exhausted or vented, the tensioned springs 42 and 43 draw the yoke back to engagement with stop 34 and into the relationship wherein piston shaft 38 is aligned with longitudinal axis 27—27 of the test cell. Under this stop condition, the apparatus is prepared for pressurization of the upper portion of cylinder 36 and an accompanying lowering of the piston into the test cell opening. Diametrically opposed interference rollers 46 and 47 tend to remain locked in a given angular orientation about the axis of piston shaft 38 when they have been elevated to engage the wire cables 48 and 49, and they are held accurately in this orientation until the plunger is depressed downwardly into the test cell by pressurization of the upper portion of cylinder 36. Therefore, the plunger will be mated with the other test cell elements in a predetermined angular orientation about longitudinal axis 27—27 each time the test cell is closed. Capacitance variations due to mechanical orientations of the electrodes during successive testing operations are minimized in this manner. An important aspect of this construction lies in the production of both linear and angular movements in the cell assembly by pneumatic-actuated motive means producing only linear mechanical outputs.

A control system for actuation of the test cell assembly is presented in FIGURE 3 of the drawings, and includes an electrical power source 55, a double solenoid electric four-way pneumatic valve 56, a sensitive electric switch 57, and a push button control switch 58. Valve inlet 59 is coupled with a pressurized source of air and the solenoid valve 56 is of a known construction wherein with no electrical excitation of a valve solenoid winding it admits pressurized air to tube 41 and occasions raising of plunger 5 and backward pivotal movement of the plunger and U-shaped frame about pivot axis 29—29. The assembly thus tends to assume the full-line position illustrated in FIGURE 4 when electrical energization is absent. The push button switch 58 may at such times be closed to energize a solenoid winding of valve 56 to cause both portions of pneumatic chamber 36 to be exhausted or vented through their tubes 41 and 40 and through a vent tube 60, the result then being that tensioned springs 42 and 43 will bring the yoke and plunger into alignment with the longitudinal cell axis. This action occurs smoothly, in part due to the natural damping effect of slight movements of piston 37 in chamber 36 as the taut wire cables 48 and 49 press the rollers 46 and 47 in a downward direction. Just as yoke 28 approaches abutment with stop 34 due to the biasing by springs 42 and 43, the lever 61 pivoted on flange 19 is pressed by the yoke and pivots in a direction to close the sensitive electrical switch 57. Upon closure, switch 57 couples excitation from source 55 to a solenoid winding of valve 56 to connect tube 40 with the pressurized air source while exhausting or venting tube 41. Accordingly, the pressurization in the upper chamber of cylinder 36 depresses plunger 5 and forces it into the accommodating bore in the test cell under full pressure until the cooperating surfaces of annular plate 18 and flange 23 abut one another. The desired compacting of bulk material within cavity 26 occurs during this pressurized downward movement of plunger 5. The electrical leads 62 coupling switch 57 with solenoid valve 56 are shown to accomplish this coupling through push button 58, and at any time that push button 58 is released, the tube 40 will be vented and tube 41 pressurized such that the plunger and yoke will automatically pivot backward in a fail-safe manner. The plunger 63 which actuates sensitive switch 57 responsive to movements of pivoted arm 61 is preferably a spring-biased element which tends to open the switch and simultaneously poise the arm 61 for subsequent actuation by movement of the yoke 23.

Practice of these teachings is not limited to the particular form of mechanisms illustrated, and it will be possible to substitute other springs, switches, and other elements without sacrifice in advantageous operating characteristics. It should thus be understood that the foregoing description of preferred embodiments of the invention has been presented by way of explanation rather than limitation, and those skilled in the art will recognize that various modifications, substitutions and combinations may be made without departure in spirit or scope from the invention in its broader aspect.

What I claim as new and desire to secure by Letters Patent of the United States is:

1. Test apparatus comprising a pair of relatively movable measurement members, motive means, a frame supporting said motive means, means connecting one of said members with said motive means for linear reciprocating movements thereby in relation to said frame, means mounting said frame for pivotal movements about an axis normal to directions of said linear reciprocating movements, the other of said members being fixed in relation to said mounting means, means connected with said mounting means and frame resiliently biasing said frame to a predetermined angular orientation about said axis wherein linear movements by said motive means actuate said one member into a predetermined relationship with said other of said members, cable means having one end fixed with said frame and another end fixed with said other of said members at a position displaced from said axis, an interference member fixed with said one member and disposed to press against said cable means intermediate the ends thereof as said one member is linearly moved away from said predetermined relationship by said motive means, whereby said cable means urges said frame angularly about said axis against restraint of said biasing means as said motive means moves said one member away from said predetermined relationship.

2. Test apparatus comprising a pair of relatively movable measurement members, a frame, motive means mounted on said frame and supporting and producing linear reciprocating movements of one of said members in relation to said frame, means mounting said frame for pivotal movements about an axis normal to directions of said linear reciprocating movements, the other of said members being fixed in relation to said mounting means, spring means connected with said mounting means and frame biasing said frame to a predetermined angular orientation about said axis wherein linear movements by said motive means in one direction actuate said one member into a predetermined relationship with said other member, cable means stretched between said frame and said other member out of parallelism with directions of said linear movements, an interference member fixed with said one member and disposed to press against said cable as said one member is moved linearly away from said predetermined relationship by said motive means, whereby said cable means urges said frame angularly about said axis against restraint of said spring means as said motive means moves said one member away from said predetermined relationship.

3. Test apparatus comprising a pair of relatively movable measurement members, a frame, motive means mounted on said frame and supporting and producing linear reciprocating movements of one of said members in relation to said frame, means mounting said frame for pivotal movements about an axis normal to directions of said linear reciprocating movements, the other of said members being fixed in relation to said mounting means, stop means fixed with said other member limiting angular movements of said frame about said axis, spring means connected with said mounting means and frame urging said frame to engagement with said stop means at a predetermined angular orientation about said axis wherein linear movements by said motive means in one direction actuate said one member into a predetermined relationship with said other member, cable means connected between said frame and said other member out of parallelism with directions of said linear movements, said cable means being stretched taut with said frame and other member in said predetermined angular orientation, interference means fixed with said one member and disposed to press against said taut cable means as said one member is moved linearly away from said predetermined relationship by said motive means, whereby said frame is urged angularly about said axis into engagement with said stop means at another angular orientation, and control means for selectively de-energizing said motive means and energizing said motive means to produce said linear movements in one or another direction.

4. Test apparatus comprising a pair of relatively movable measurement members, a frame, motive means mounted on said frame and supporting and producing linear reciprocating movements of one of said members in relation to said frame, means mounting said frame for pivotal movements about an axis normal to directions of said linear movements, the other of said members being fixed in relation to said mounting means, means connected with said mounting means and frame resiliently urging said frame to a predetermined angular orientation about said axis wherein linear movements by said motive means in one direction actuate said one member into a predetermined relationship with said other member, cable means connected between said frame and said other member out of parallelism with directions of said linear movements, interference means fixed with said one member and disposed to press against said cable means as said one member is moved linearly away from said predetermined relationship by said motive means, whereby said frame is urged angularly about said axis against restraint of said resilient means, means for energizing said motive means selectively to move said one member linearly away from said predetermined relationship and to move said one member into said predetermined relationship with said other member, control means normally making connection of said energizing means with said motive means to energize said motive means to move said one member away from said predetermined relationship and selectively adjustable to interrupt said connection, and switch means connected in circuit with said motive means, energizing means and control means and actuated by movements of said frame into said predetermined angular orientation to connect said energizing means with said motive means through said control means to energize said motive means to actuate said one member into said predetermined relationship when said control means is adjusted to interrupt said connection.

5. Test apparatus comprising a pair of relatively movable capacitor electrodes, pneumatic cylinder and piston means supporting and producing linear reciprocating movements of one of said electrodes, a frame supporting said pneumatic means, means mounting said frame for pivotal movements in relation to the other of said electrodes about an axis normal to directions of said linear movements, the other of said electrodes being fixed in relation to said mounting means, resilient means connected with said mounting means and frame biasing said frame to a predetermined angular orientation about said axis wherein linear movements by said pneumatic means in one direction actuate said one electrode into a predetermined relationship with said other electrode, cable means connected between said frame and said other electrode out of parallelism with directions of said linear movements, interference means fixed with said one electrode and disposed to press against said cable means as said one electrode is moved linearly away from said predetermined relationship by said pneumatic means, whereby said frame is urged angularly about said axis, and control means for selectively de-energizing said pneumatic means and for energizing said pneumatic means to produce said linear movements in one or another direction.

6. Test apparatus comprising a pair of relatively movable capacitor electrodes, pneumatic cylinder and piston means supporting and producing linear reciprocating movements of one of said electrodes, a frame supporting said pneumatic means, means mounting said frame for pivotal movements in relation to the other of said electrodes about an axis normal to directions of said linear reciprocating movements, the other of said electrodes being fixed in relation to said mounting means, spring means connected with said mounting means and frame resiliently urging said frame to a predetermined angular orientation about said axis wherein linear movements by said pneumatic means in one direction actuate said one electrode into a predetermined relationship with said other electrode, cable means connected between said frame and said other electrode out of parallelism with directions of said linear movements, said cable means being stretched taut with said frame and other electrode in said predetermined angular orientation, interference means fixed with said one electrode and disposed to press against said taut cable means as said one electrode is moved linearly away from said predetermined relationship by said pneumatic means, whereby said frame is urged angularly about said axis to another angular orientation, control valve means for coupling pressurized fluid to said pneumatic means to move said one electrode away from said predetermined relationship with said other electrode, manually actuated control means connected with and controlling said control valve means to exhaust said pneumatic means to a passive condition, and means actuated by movement of said frame into said predetermined angular orientation for energizing said control valve to couple pressurized fluid to said pneumatic means to move said one electrode into said predetermined orientation with said other electrode.

7. Test apparatus comprising a pair of capacitor electrodes shaped to mate in a nested relationship, pneumatic cylinder and piston means supporting and producing linear reciprocating movements of one of said electrodes, a U-shaped frame supporting said pneumatic means, means mounting said frame for pivotal movements about the other of said electrodes about an axis normal to directions of said linear movements, stop means fixed with said other electrode limiting angular movements of said frame about said axis, the other of said electrodes being fixed in relation to said mounting means, spring means connected with said mounting means and frame urging said frame into engagement with said stop means at a predetermined angular orientation about said axis wherein linear movements by said pneumatic means in one direction actuate said one electrode into a nested relationship with said other electrode, a pair of cables each fixed at one end with a different one of the sides of said frame and at another end with said other electrode and disposed out of parallelism with directions of said linear movements, said cables being streached taut with said frame and other electrode in said predetermined angular orientation, interference means fixed with said other electrode on opposite sides thereof and disposed to press against said taut cables as said one electrode is moved linearly away from said nested relationship by said pneumatic means, whereby said frame is urged angularly about said axis into engagement with said stop means at another angular orientation, electrical energizing means, electrically actuated control valve means for admitting pressurized fluid to said pneumatic means when de-energized to actuate said one electrode in a direction away from said nested relationship with said other electrode, first electrical switch means connected with said energizing means and control valve means for connecting said energizing means to energize said control valve means to exhaust said pneumatic means to a passive condition wherein said spring means urges said frame to said predetermined angular orientation about said axis, second switch means in circuit with said energizing means and control valve means and actuated by movement of said frame to said predetermined angular orientation about said axis to energize said control valve means to admit pressurized fluid to said pneumatic means for actuation of said one electrode into said nested relationship with said other electrode, and means coupling said second switch means to said control valve means through said first switch means whereby said second switch means actuates said control valve means only when said first switch means is closed.

References Cited in the file of this patent
UNITED STATES PATENTS

| | | |
|---|---|---|
| 867,142 | Kuensting | Sept. 24, 1907 |
| 1,841,413 | Macchia | Jan. 19, 1932 |
| 2,018,126 | Garrett | Oct. 22, 1935 |
| 2,343,340 | Stevens | Mar. 7, 1944 |
| 2,390,849 | Shoup | Dec. 11, 1945 |
| 2,482,680 | McNamara | Sept. 20, 1949 |
| 2,622,137 | Stockton | Dec. 16, 1952 |